United States Patent
McKinzie

(10) Patent No.: US 9,944,163 B2
(45) Date of Patent: Apr. 17, 2018

(54) MULTI-MODE POWER TRAINS

(71) Applicant: Deere & Company, Moline, IL (US)

(72) Inventor: Kyle K. McKinzie, Altamont, KS (US)

(73) Assignee: Deere & Company, Moline, IL (US)

( * ) Notice: Subject to any disclaimer, the term of this patent is extended or adjusted under 35 U.S.C. 154(b) by 587 days.

(21) Appl. No.: 14/249,258

(22) Filed: Apr. 9, 2014

(65) Prior Publication Data

US 2015/0292608 A1    Oct. 15, 2015

(51) Int. Cl.
| | |
|---|---|
| *B60K 6/00* | (2006.01) |
| *B60K 6/445* | (2007.10) |
| *B60K 6/547* | (2007.10) |
| *F16H 3/72* | (2006.01) |
| *B60K 6/12* | (2006.01) |
| *F16H 37/08* | (2006.01) |

(52) U.S. Cl.
CPC ............... *B60K 6/00* (2013.01); *B60K 6/445* (2013.01); *B60K 6/547* (2013.01); *F16H 3/728* (2013.01); *B60K 6/12* (2013.01); *F16H 2037/0886* (2013.01); *Y02T 10/6208* (2013.01); *Y02T 10/6239* (2013.01)

(58) Field of Classification Search
CPC ... F16H 2037/0886; B60K 6/445; B60K 6/12; Y02T 10/6239; Y02T 10/6208
See application file for complete search history.

(56) References Cited

U.S. PATENT DOCUMENTS

| | | |
|---|---|---|
| 3,626,787 A | 12/1971 | Singer |
| 3,783,711 A * | 1/1974 | Orshansky, Jr. ........ F16H 47/04 475/81 |
| 5,508,574 A | 4/1996 | Vlock |
| 7,252,611 B2 | 8/2007 | Raghavan et al. |
| 7,329,201 B2 | 2/2008 | Raghavan et al. |
| 7,367,911 B2 | 5/2008 | Raghavan et al. |

(Continued)

FOREIGN PATENT DOCUMENTS

| | | |
|---|---|---|
| DE | 102006041160 A1 | 9/2008 |
| EP | 1707416 | 8/2007 |

OTHER PUBLICATIONS

German Search Report issued in counterpart application No. 10 2015 206 174.4, dated Jul. 16, 2015 (7 pages).

(Continued)

*Primary Examiner* — Erin D Bishop
(74) *Attorney, Agent, or Firm* — Lorenz & Kopf, LLP

(57) ABSTRACT

A power train and related vehicle are described for multi-mode power transmission. A first continuously variable power source ("CVP") may convert rotational power received by the engine for transmission to a second CVP. A variator assembly may receive rotational power from the second CVP at a first input and directly from the engine at a second input. A control assembly may include one or more output components and a plurality of clutch devices arranged between the one or more output components and the variator assembly and engine. In a first state of the control assembly, the plurality of clutch devices may collectively provide direct power transmission between the engine and the one or more output components. In a second state of the control assembly, the plurality of clutches may collectively provide power transmission between the variator and the one or more output components.

15 Claims, 5 Drawing Sheets

(56) References Cited

U.S. PATENT DOCUMENTS

| | | | |
|---|---|---|---|
| 7,399,246 B2 * | 7/2008 | Holmes | B60K 6/40 |
| | | | 475/5 |
| 7,465,251 B2 | 12/2008 | Zhang | |
| 7,491,144 B2 | 2/2009 | Conlon | |
| 7,942,776 B2 | 5/2011 | Conlon | |
| 2010/0179009 A1 | 7/2010 | Wittkopp et al. | |
| 2010/0261565 A1 | 10/2010 | Al et al. | |
| 2011/0130235 A1 | 6/2011 | Phillips | |

OTHER PUBLICATIONS

Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.

John M. Miller, Hybrid Electric Vehicle Propulsion System Architectures of the e-CVT Type, IEEE Transactions on Power Electronics, vol. 21, No. 3, May 2006.

* cited by examiner

MULTI-MODE POWER TRAINS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to power trains, including power trains for the operation of work vehicles for agricultural, forestry, construction, and other applications.

BACKGROUND OF THE DISCLOSURE

It may be useful, in a variety of settings, to utilize both a traditional engine (e.g., an internal combustion engine) and one or more continuously variable power sources (e.g., an electric motor/generator or hydraulic motor/pump, and so on) to provide useful power. For example, a portion of engine power may be diverted to drive a first continuously variable power source ("CVP") (e.g., a first electric motor/generator acting as a generator, a first hydrostatic or hydrodynamic motor/pump acting as a pump, and so on), which may in turn drive a second CVP (e.g., a second electric motor/generator acting as a motor using electrical power from the first electric motor/generator, a second hydrostatic or hydrodynamic motor/pump acting as a motor using the hydraulic power from the first hydrostatic or hydrodynamic motor/pump, and so on).

In certain applications, power from both types of power sources (i.e., an engine and a CVP) may be combined for delivery of useful power (e.g., to drive a vehicle axle) via an infinitely variable transmission ("IVT") or continuously variable transmission ("CVT"). This may be referred to as "split-mode" or "split-path mode" because power transmission may be split between a direct mechanical path from the engine and an infinitely/continuously variable path through one or more CVPs. In other applications, in contrast, useful power may be provided by a CVP but not by the engine (except to the extent the engine drives the CVP). This may be referred to as "CVP-only mode." Finally, in still other applications, useful power may be provided by the engine (e.g., via various mechanical transmission elements, such as shafts and gears), but not by a CVP. This may be referred to as "mechanical-path mode." It will be understood that torque converters and various similar devices may sometimes be used in the mechanical-path mode. In this light, a mechanical-path mode may be viewed simply as a power transmission mode in which the engine, but not the CVPs, provides useful power to a particular power sink.

SUMMARY OF THE DISCLOSURE

A power train and a vehicle for providing multiple transmission modes are disclosed. According to one aspect of the disclosure, a power train for a vehicle with an engine includes a variator assembly and a control assembly with an output component and a plurality of clutch devices arranged between the output component and at least one of the variator assembly and the engine. A first continuously variable power source ("CVP") may convert rotational power received by the engine for transmission to a second CVP. The variator assembly may receive power from the second CVP at a first input and may receive rotational power directly from the engine at a second input, in order to sum the power of the respective inputs. In a first state of the control assembly, the plurality of clutch devices may collectively provide direct power transmission between the engine and the output component. In a second state of the control assembly, the plurality of clutch devices may collectively provide power transmission between the variator and the one or more output components.

In certain embodiments, a first clutch device of the control assembly may receive power directly from the engine and a second clutch device of the control assembly may receive power, via the variator assembly, from the engine and the second CVP. In the first state of the control assembly, the first clutch device may be engaged and the second clutch device may be disengaged. In the second state of the control assembly, the first clutch device may be disengaged and the second clutch device may be engaged.

In certain embodiments, a third clutch device of the control assembly may receive power directly from the second CVP. In a third state of the control assembly, the first and second clutch devices may be disengaged and the third clutch device may be engaged, in order to transmit power directly from the second CVP to the output component of the control assembly.

In certain embodiments, two or more of the first, second and third clutch devices may be mounted to a single shaft or to multiple coaxial shafts. In certain embodiments, various coaxial, parallel or other shafts may be utilized. The variator assembly may include a planetary gear set including a sun gear, a ring gear and a planet carrier. The second CVP may provide power to the sun gear and the engine may provide power to the planet carrier.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
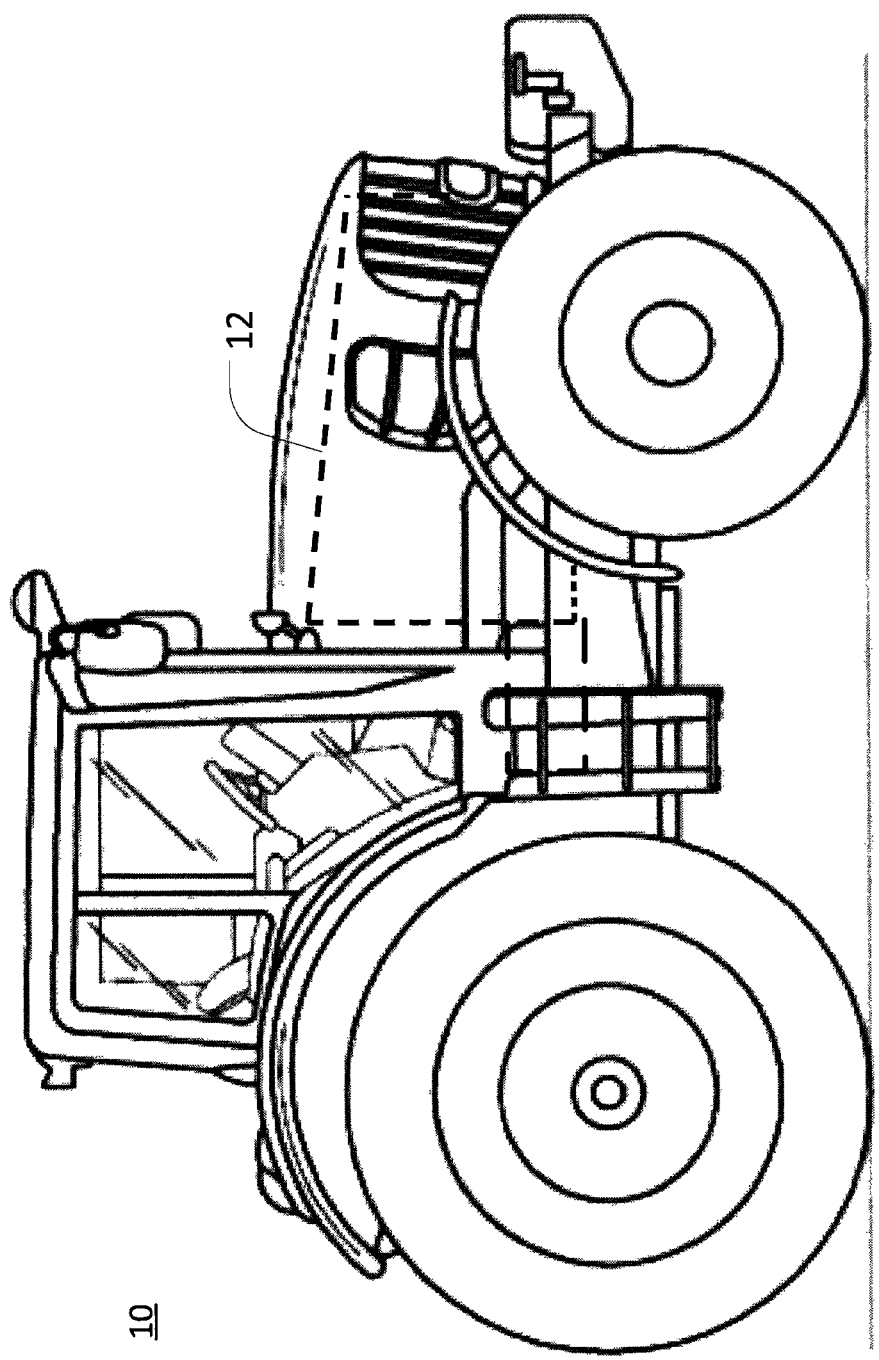
FIG. 1 is a side view of an example vehicle that may include a multi-mode transmission according to the present disclosure.

The following describes one or more example embodiments of the disclosed power train (or vehicle), as shown in the accompanying figures of the drawings described briefly above. Various modifications to the example embodiments may be contemplated by one of skill in the art.

For convenience of notation, "component" may be used herein, particularly in the context of a planetary gear set, to indicate an element for transmission of power, such as a sun gear, a ring gear, or a planet gear carrier. Further, references to a "continuously" variable transmission, power train, or power source will be understood to also encompass, in various embodiments, configurations including an "infinitely" variable transmission, power train, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if some portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly).

Also as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

In the use of continuously (or infinitely) variable power trains, the relative efficiency of power transmission in various modes may be of some concern. It will be understood, for example, that energy losses may inhere in each step of using a first CVP to convert rotational power from the engine into electrical or hydraulic power, transmitting the converted power to a second CVP, and then converting the transmitted power back to rotational power. In this light, mechanical transmission of power directly from an engine (i.e., in a mechanical-path transmission mode) may be viewed a highly efficient mode of power transmission, whereas transmission of power through a CVP (e.g., in a split-path transmission mode or a CVP-only transmission mode) may be less efficient. Accordingly, in certain circumstances it may be desirable to utilize mechanical-path transmission mode rather than a split-path mode or CVP-only mode. However, in other circumstances, the flexibility and other advantages provided by use of CVPs may outweigh the inherent energy losses of a split-path or CVP-only mode.

Among other advantages, the power trains disclosed herein may usefully facilitate transition between split-path, mechanical-path, and CVP-only modes for a vehicle or other powered platform. For example, through appropriate arrangement and control of various gear sets, shafts and clutches, the disclosed power train may allow a vehicle to be easily transitioned between any of the three modes, depending on the needs of a particular operation.

In certain embodiments of the contemplated power train, an engine may provide power via various mechanical (or other) power transmission elements (e.g., various shafts and gears, and so on) to both a first input component of a variator (e.g., a planet carrier of a summing planetary gear set) and an input interface (e.g., a splined connection for a rotating shaft) of a first CVP. The first CVP (e.g., an electrical or hydraulic machine) may convert the power to a different form (e.g., electrical or hydraulic power) for transmission to a second CVP (e.g., another electrical or hydraulic machine), in order to allow the second CVP to provide rotational power to a second input of the variator (e.g., a sun gear of the summing planetary gear set).

A control assembly may be provided having at least a first and a second clutch device in communication with one or more output components (e.g., an input shaft to a power-shift transmission). The clutch devices may be generally oriented between the output components (and various power sinks of the vehicle, such as the vehicle wheels, differential, power take-off shaft, and so on) and one or more of the engine and the CVPs. In certain embodiments, the first and second clutch devices may be mounted to a single shaft (or set of coaxial shafts), which may rotate in parallel with the various inputs to the variator (e.g., the various inputs to a planetary gear set), the output shafts of the engine and CVPs, and so on. In certain embodiments, the first and second clutches may be mounted to different shafts, each of which may rotate in parallel with the inputs to the variator.

The first clutch device of the control assembly may receive rotational power directly from the engine. For example, the first clutch device may engage a gear that is in communication an output shaft of the engine (e.g., the same output shaft that drives the first input component of the variator) through one or more geared connections. As such, the first clutch device may provide a controllable power transmission path for direct power transmission from the engine to the output of the control assembly.

The second clutch device of the control assembly may receive rotational power from an output component of the variator (e.g., a ring gear of the planetary gear set). For example, the second clutch device may engage a gear that is in communication with the output component of the variator through one or more geared connections. As such, the second clutch device may provide a controllable power transmission path for power transmission from both the engine and the second CVP, via the variator, to the output of the control assembly.

With the configuration generally described above (and others), engaging the first clutch device and disengaging the second clutch device may place the power train into a mechanical-path mode, causing power to flow directly from the engine through the first clutch device and the control assembly to an output of the control assembly. In certain embodiments, such output may be, or may engage with, an input of an additional power train component (e.g., the input of a power-shift or other transmission). Similarly, engaging the second clutch device and disengaging the first clutch device may place the power train into a split-path mode, with power from the engine and the second CVP (as powered by the engine via the first CVP) being summed by the variator before flowing through the second clutch device and the control assembly to the control assembly output.

In certain embodiments, a third clutch device may also be included in the control assembly between the output components of the control assembly and one or more of the engine and the CVPs. In certain embodiments, the third clutch device may be mounted to the same shaft (or set of coaxial shafts) as the first and second clutch devices. In certain embodiments, the third clutch device may be mounted to different shafts from one or both of the first and second clutch devices (e.g., a different, parallel shaft).

The third clutch device may receive rotational power directly from the second CVP. For example, the third clutch device may engage a gear in communication with an output shaft of the second CVP (e.g., the same output shaft that drives the second input component of the variator) through one or more geared connections. As such, engaging the third clutch device and disengaging the first and second clutch devices may place the power train into a CVP-only mode, with power flowing directly from the second CVP through the third clutch device and the control assembly to an output (e.g., the input of a power-shift or other transmission). In such a configuration, the third clutch device may then be disengaged for the mechanical-path and split-path modes described above.

As will become apparent from the discussion herein, the disclosed power train may be used advantageously in a variety of settings and with a variety of machinery. For example, referring now to FIG. 1, an example of the disclosed power trains may be included in a vehicle 10. In FIG. 1, the vehicle 10 is depicted as a tractor with a power train 12. It will be understood, however, that other configurations may be possible, including configurations with vehicle 10 as a different kind of tractor, a harvester, a log skidder, a grader, or one of various other work vehicle types. It will further be understood that the disclosed power trains may also be used in non-work vehicles and non-vehicle applications (e.g., fixed-location power installations).

Figure 2:
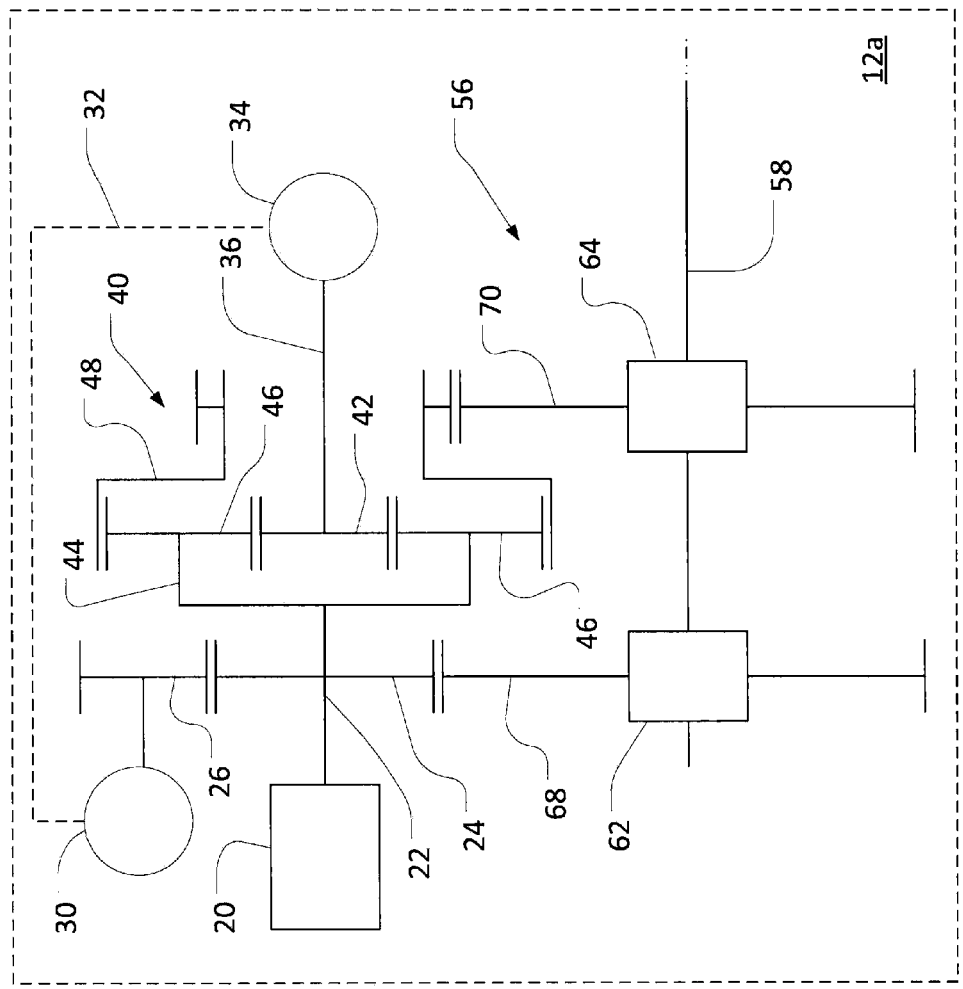
FIG. 2 is a schematic view of an example power train of the example vehicle of FIG. 1.

Referring also to FIG. 2, an example configuration of the power train 12 is depicted as a power train 12a. The power train 12a may include an engine 20, which may be an internal combustion engine of various known configurations. The power train 12a may also include a CVP 30 (e.g., an electrical generator or hydraulic pump) and a CVP 34 (e.g., an electrical or hydraulic motor, respectively), which may be connected by a conduit 32 (e.g., an electrical or hydraulic conduit, respectively).

The engine 20 may provide rotational power to an output shaft 22, for transmission to various power sinks (e.g., wheels, power take-off ("PTO") shafts, and so on) of the vehicle 10. In certain embodiments, a torque converter or other device may be included between the engine 20 and the shaft 22 (or another shaft (not shown)), although such a device is not necessary for the operation of the power train 12a, as contemplated by this disclosure. Further, in certain embodiments, multiple shafts (not shown), including various shafts interconnected by various gears or other power transmission devices, or equivalent power transmission devices (e.g., chains, belts, and so on) may be used in place of the shaft 22 (or various other shafts discussed herein).

The engine 20 may also provide rotational power to the CVP 30. For example, the engine output shaft 22 may be configured to provide rotational power to a gear 24, or another power transmission component (not shown), for transmission of power from the engine 20 to a gear 26 on a parallel shaft. In turn, the gear 26 (via the parallel shaft) may provide rotational power to the CVP 30.

Continuing, the CVP 30 may convert the received power to an alternate form (e.g., electrical or hydraulic power) for transmission over the conduit 32. This converted and transmitted power may be received by the CVP 34 and then re-converted by the CVP 34 to provide a rotational power output (e.g., along an output shaft 36). Various known control devices (not shown) may be provided to regulate such conversion, transmission, re-conversion and so on.

Both the engine 20 and the CVP 34 may provide rotational power to a variator 40 via, respectively, the shafts 22 and 36 (or various similar components). Generally, the variator 40 may include a variety of devices capable of summing the mechanical inputs from the shafts 22 and 36 for a combined mechanical output, as may be useful, for example, for split-path power transmission. In certain embodiments, as depicted in FIG. 2, the variator 40 may be configured as a summing planetary gear set. As depicted, the shaft 22 may provide power to a planet carrier 44, the shaft 36 may provide power to a sun gear 42, and planet gears 46 may transmit power from both the planet carrier 44 and the sun gear 42 to a ring gear 48. This may be a useful configuration because the CVP 34 may more efficiently operate at higher rotational speeds than the engine 20, which may be complimented by the speed reduction from the sun gear 42 to the planet carrier 44. It will be understood, however, that other configurations may be possible, with the engine 20 providing rotational power to any of the sun gear 42, the planet carrier 44, and the ring gear 48, the CVP 34 providing rotational power, respectively, to any other of the sun gear 42, the planet carrier 44, and the ring gear 48, and the remaining one of the sun gear 42, the planet carrier 44, and the ring gear 48.

To control transition between various transmission modes, a control assembly 56 may be configured to receive power one or more of directly from the engine 20, from the engine 20 and the CVP 34 via the variator 40, and directly from the CVP 34, and to transmit the received power to various downstream components. In the power train 12a, for example, the control assembly 56 may include a single output shaft (or set of coaxial output shafts) 58 or various other output components, which may be in communication with various power sinks or other downstream components (not shown) of the vehicle 10, such as various vehicle wheels, one or more differentials, a power-shift or other transmission, and so on. The shaft(s) 58 may also be in communication with (e.g., may be engaged with) clutch devices 62 and 64, which may be variously configured as wet clutches, dry clutches, dog collar clutches, or other similar devices mounted to the shaft(s) 58.

The clutch device 62 may be in communication with a gear 68, which may be meshed (directly or indirectly) with the gear 24 on the engine output shaft 22. Accordingly, when the clutch device 62 is engaged, a power-transmission path may be provided from the engine 20 to the shaft(s) 58, via the gears 24 and 68 and the clutch device 62. (As depicted, the gear 24 may transmit power from the shaft 22 to both the CVP 30 and the gear 68. It will be understood, however, that separate gears (not shown) may separately transmit power, respectively, from the engine 20 to the gears 26 and 68.)

Similarly, the clutch device 64 may be in communication with a gear 70, which may be meshed (directly or indirectly) with the ring gear 48 (or another output component) of the variator 40. Accordingly, when the clutch device 64 is engaged, a power-transmission path may be provided from the variator 40 to the shaft(s) 58, via the gear 70 and the clutch device 64.

In this way, for example, engaging the clutch device 62 and disengaging the clutch device 64 may place the power train 12a in a mechanical-path mode, in which rotational power is directly transmitted from the engine 20, via the clutch device 62, to the shaft(s) 58. Further, engaging the clutch device 64 and disengaging the clutch device 62 may place the power train 12a in a split-path mode, in which power from both the engine 20 and the CVP 34 is combined in the variator 40 before being transmitted, via the clutch device 64, to the shaft(s) 58.

Figure 3:
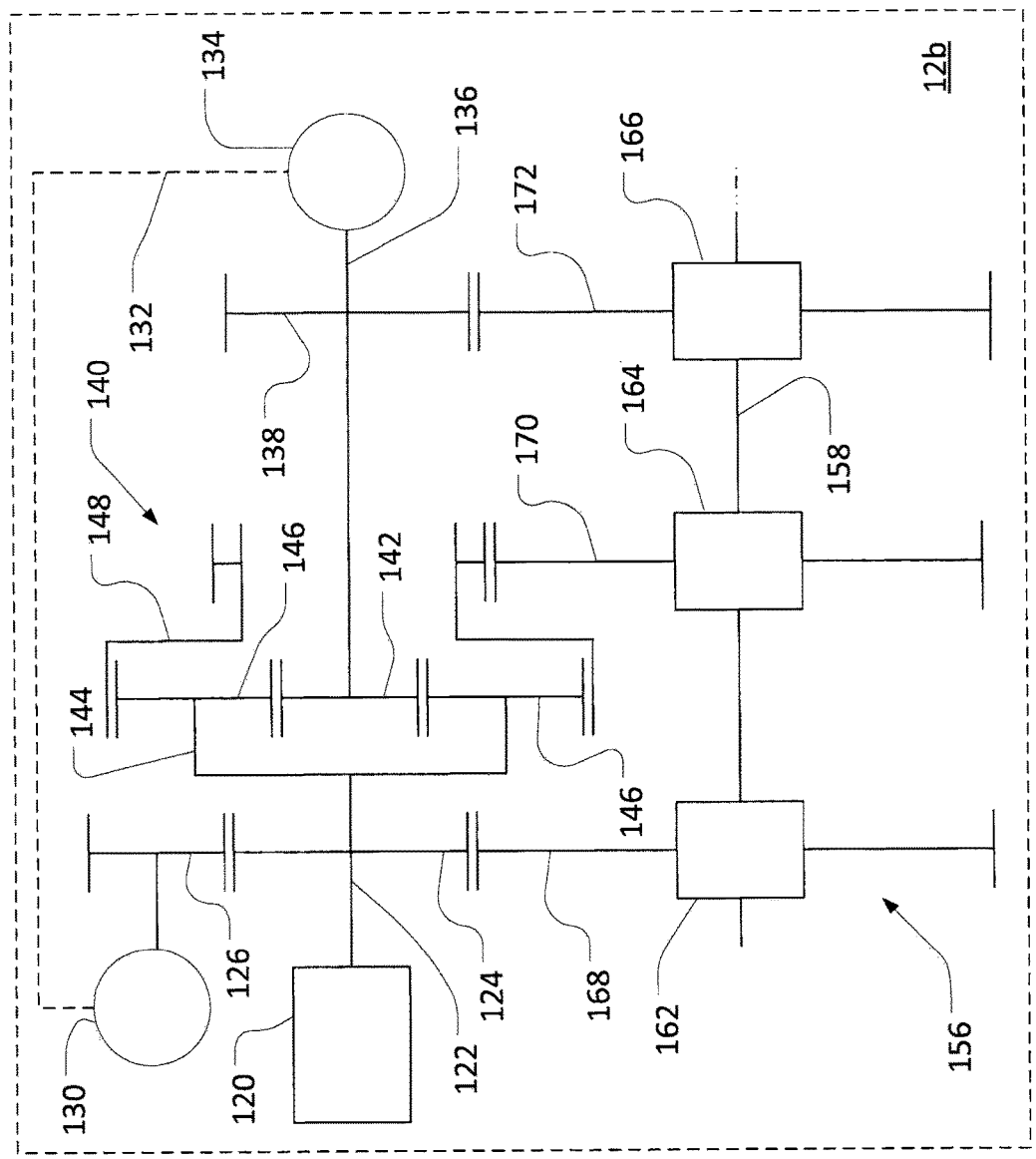
FIG. 3 is a schematic view of another example power train of the example vehicle of FIG. 1.

Referring also to FIG. 3, another example power train 12b is depicted. The power train 12b may include an engine 120, which may be an internal combustion engine of various known configurations. The power train 12b may also include a CVP 130 (e.g., an electrical generator or hydraulic pump) and a CVP 134 (e.g., an electrical or hydraulic motor, respectively), which may be connected by a conduit 132 (e.g., an electrical or hydraulic conduit, respectively).

The engine 120 may provide rotational power to an output shaft 122, for transmission to various power sinks (e.g., wheels, PTO shafts, and so on) of the vehicle 10. In certain embodiments, a torque converter or other device may be included between the engine 120 and the shaft 122 (or another shaft (not shown)), although such a device is not necessary for the operation of the power train 12b, as contemplated by this disclosure. Further, in certain embodiments, multiple shafts (not shown), including various shafts interconnected by various gears or other power transmission devices, or equivalent power transmission devices (e.g., chains, belts, and so on) may be used in place of the shaft 122 (or various other shafts discussed herein).

The shaft 122 may be configured to provide rotational power to a gear 124, or another power transmission component (not shown), for transmission of power from the engine 120 to a gear 126. In turn, the gear 126 may provide rotational power to the CVP 130, for conversion to an alternate form (e.g., electrical or hydraulic power) for transmission over the conduit 132. This converted and transmitted power may then be re-converted by the CVP 134 for mechanical output along an output shaft 136. Various known control devices (not shown) may be provided to regulate such conversion, transmission, re-conversion and so on. In certain embodiments, the shaft 136 may be in communication with a spur gear 138 (or other similar component).

Both the engine 120 and the CVP 134 may provide rotational power to a variator 140 via, respectively, the shafts 122 and 136. Generally, the variator 140 may include a variety of devices capable of summing the mechanical inputs from the shafts 122 and 136 for a combined mechanical output, as may be useful, for example, for split-path power transmission. In certain embodiments, as depicted in FIG. 3, the variator 140 may be configured as a summing planetary gear set. As depicted, the shaft 122 may provide power to a planet carrier 144, the shaft 136 may provide power to a sun gear 142, and planet gears 146 may transmit power from both the planet carrier 144 and the sun gear 142 to a ring gear 148. This may be a useful configuration because the CVP 134 may more efficiently operate at higher rotational speeds than the engine 120, which may be complimented by the speed reduction from the sun gear 142 to the planet carrier 144. It will be understood, however, that other configurations may be possible, with the engine 120 providing rotational power to any of the sun gear 142, the planet carrier 144, and the ring gear 148, the CVP 134 providing rotational power, respectively, to any other of the sun gear 142, the planet carrier 144, and the ring gear 148, and the remaining one of the sun gear 142, the planet carrier 144, and the ring gear 148.

To control transition between various transmission modes, a control assembly 156 may be configured to receive power one or more of directly from the engine 120, from the engine 120 and the CVP 134 via the variator 140, and directly from the CVP 134, and to transmit the received power to various downstream components. In the power train 12b, for example, the control assembly 156 may include a single shaft (or set of coaxial shafts) 158, which may be in communication with various power sinks or other downstream components (not shown) of the vehicle 10, such as various vehicle wheels, one or more differentials, a power-shift or other transmission, and so on. The shaft(s) 158 may also be in communication with (e.g., may be engaged with) clutch devices 162, 164 and 166, which may be variously configured as wet clutches, dry clutches, dog collar clutches, or other similar devices mounted to the shaft(s) 158.

The clutch device 162 may be in communication with a gear 168, which may be meshed (directly or indirectly) with the gear 124 on the engine output shaft 122. Accordingly, when the clutch device 162 is engaged, a power-transmission path may be provided from the engine 120 to the shaft(s) 158, via the gears 124 and 168 and the clutch device 162. (As depicted, the gear 124 may transmit power from the shaft 122 to both the CVP 130 and the gear 168. It will be understood, however, that separate gears (not shown) may separately transmit power, respectively, from the engine 120 to the gears 126 and 168.)

Similarly, the clutch device 164 may be in communication with a gear 170, which may be meshed (directly or indirectly) with the ring gear 148 (or another output component) of the variator 140. Accordingly, when the clutch device 164 is engaged, a power-transmission path may be provided from the variator 140 to the shaft(s) 158, via the gear 170 and the clutch device 164. Finally, the clutch device 166 may be in communication with a gear 170, which may be meshed (directly or indirectly) with the gear 138 on the output shaft 136 of the CVP 134. Accordingly, when the clutch device 166 is engaged, a power-transmission path may be provided from the CVP 134 to the shaft(s) 158, via the gears 138 and 172 and the clutch device 166.

In this way, for example, engaging the clutch device 162 and disengaging the clutches 164 and 166 may place the power train 12b in a mechanical-path mode, in which rotational power is directly transmitted from the engine 120, via the clutch device 162, to the shaft(s) 158. Further, engaging the clutch device 164 and disengaging the clutches 162 and 166 may place the power train 12b in a split-path mode, in which power from both the engine 120 and the CVP 134 is combined in the variator 140 before being transmitted, via the clutch device 164, to the shaft(s) 158. Finally, engaging the clutch device 166 and disengaging the clutches 162 and 164 may place the power train 12b in a CVP-only mode, in which rotational power is directly transmitted from the CVP 134, via the clutch device 166, to the shaft(s) 158.

Figure 4:
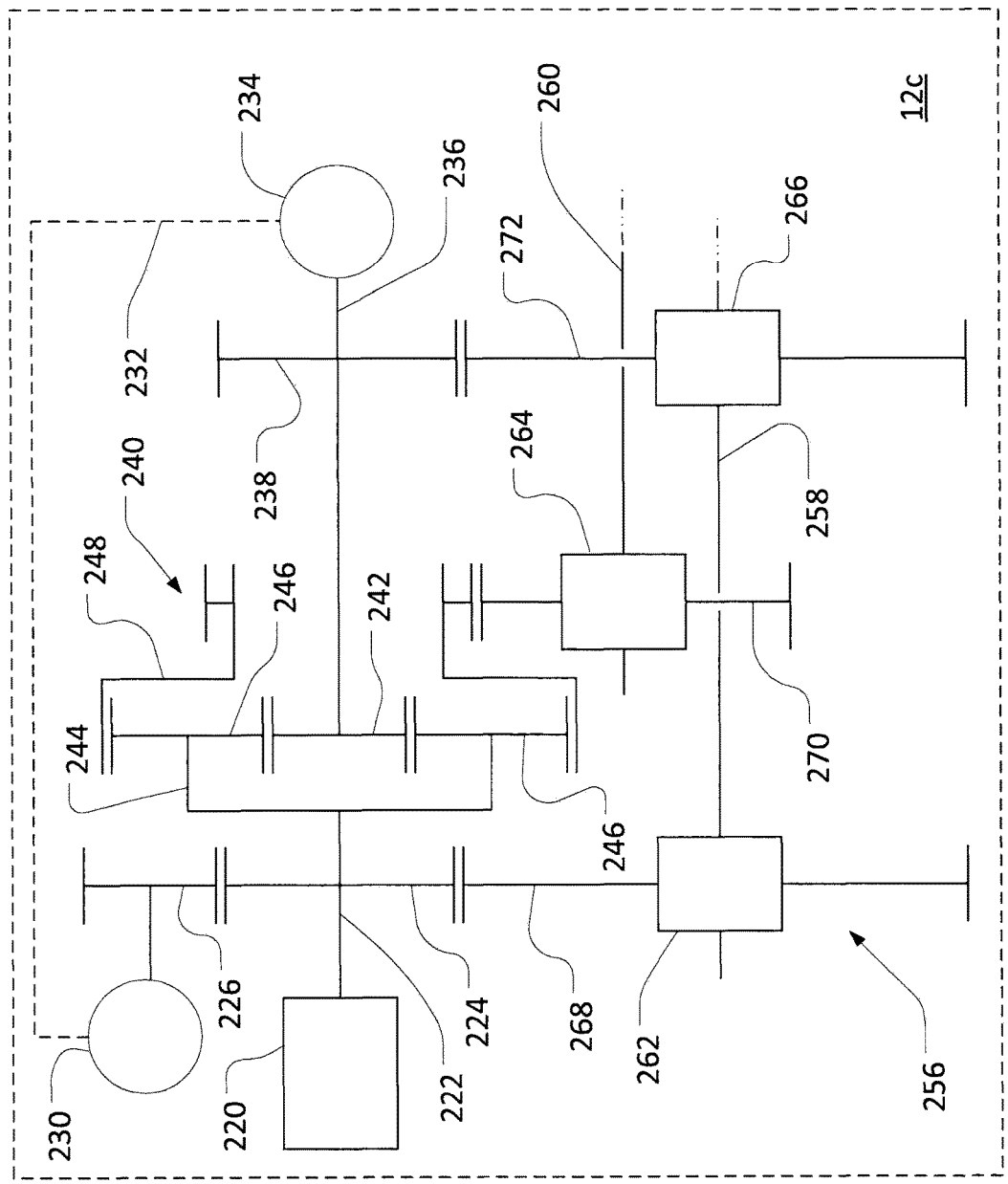
FIG. 4 is a schematic view of yet another example power train of the example vehicle of FIG. 1.

Referring also to FIG. 4, another example power train 12c is depicted. The power train 12c may include an engine 220, which may be an internal combustion engine of various known configurations. The power train 12c may also include a CVP 230 (e.g., an electrical generator or hydraulic pump) and a CVP 234 (e.g., an electrical or hydraulic motor, respectively), which may be connected by a conduit 232 (e.g., an electrical or hydraulic conduit, respectively).

The engine 220 may provide rotational power to an output shaft 222, for transmission to various power sinks (e.g., wheels, PTO shafts, and so on) of the vehicle 10. In certain embodiments, a torque converter or other device may be included between the engine 220 and the shaft 222 (or another shaft (not shown)), although such a device is not necessary for the operation of the power train 12c, as contemplated by this disclosure. Further, in certain embodiments, multiple shafts (not shown), including various shafts interconnected by various gears or other power transmission devices, or equivalent power transmission devices (e.g., chains, belts, and so on) may be used in place of the shaft 222 (or various other shafts discussed herein).

The shaft 222 may be configured to provide rotational power to a gear 224, or another power transmission component (not shown), for transmission of power from the engine 220 to a gear 226. In turn, the gear 226 may provide rotational power to the CVP 230, for conversion to an alternate form (e.g., electrical or hydraulic power) for transmission over the conduit 232. This converted and transmitted power may then be re-converted by the CVP 234 for mechanical output along an output shaft 236. Various known control devices (not shown) may be provided to regulate such conversion, transmission, re-conversion and so on. In certain embodiments, the shaft 236 may be in communication with a spur gear 138 (or other similar component).

Both the engine 220 and the CVP 234 may provide rotational power to a variator 240 via, respectively, the shafts 222 and 236. Generally, the variator 240 may include a variety of devices capable of summing the mechanical inputs from the shafts 222 and 236 for a combined mechanical output, as may be useful, for example, for split-path power transmission. In certain embodiments, as depicted in FIG. 4, the variator 240 may be configured as a summing planetary gear set. As depicted, the shaft 222 may provide power to a planet carrier 244, the shaft 236 may provide power a to sun gear 242, and planet gears 246 may transmit power from both the planet carrier 244 and the sun gear 242 to a ring gear 248. This may be a useful configuration because the CVP 234 may more efficiently operate at higher rotational speeds than the engine 220, which may be complimented by the speed reduction from the sun gear 242 to the planet carrier 244. It will be understood, however, that other configurations may be possible, with the engine 220 providing rotational power to any of the sun gear 242, the planet carrier 244, and the ring gear 248, the CVP 234 providing rotational power, respectively, to any other of the sun gear 242, the planet carrier 244, and the ring gear 248, and the remaining one of the sun gear 242, the planet carrier 244, and the ring gear 248.

To control transition between various transmission modes, a control assembly 256 may be configured to receive power one or more of directly from the engine 220, from the engine 220 and the CVP 234 via the variator 240, and directly from the CVP 234, and to transmit the received power to various downstream components. In the power train 12c, for example, the control assembly 256 may include a single shaft (or set of coaxial shafts) 258 and shaft 260, which may each be in communication with various power sinks or other downstream components (not shown) of the vehicle 10, such as various vehicle wheels, one or more differentials, a power-shift or other transmission, and so on. The shaft(s) 258 may be in communication with (e.g., may be engaged with) clutch devices 262 and 266, which may be variously configured as wet clutches, dry clutches, dog collar clutches, or other similar devices mounted to the shaft(s) 258. Similarly, the shaft 260 may be in communication with (e.g., may be engaged with) a clutch device 264, which may also be configured as a wet clutch, dry clutch dog collar clutch, or other similar device mounted to the shaft 260. It will be understood that other configurations may be possible, including configurations with different combinations of the clutch devices 262, 264 and 266 engaged with the shafts 258 and 260, or with additional shaft(s) (not shown) for engaging one or more of the clutch devices 262, 264, and 266.

The clutch device 262 may be in communication with a gear 268, which may be meshed (directly or indirectly) with the gear 224 on the engine output shaft 222. Accordingly, when the clutch device 262 is engaged, a power-transmission path may be provided from the engine 220 to the shaft(s) 258, via the gears 224 and 268 and the clutch device 262. (As depicted, the gear 224 may transmit power from the shaft 222 to both the CVP 230 and the gear 268. It will be understood, however, that separate gears (not shown) may separately transmit power, respectively, from the engine 220 to the gears 226 and 268.)

Similarly, the clutch device 264 may be in communication with a gear 270, which may be meshed (directly or indirectly) with the ring gear 248 (or another output component) of the variator 240. Accordingly, when the clutch device 264 is engaged, a power-transmission path may be provided from the variator 240 to the shaft(s) 258, via the gear 270 and the clutch device 264. Finally, the clutch device 266 may be in communication with a gear 270, which may be meshed (directly or indirectly) with the gear 138 on the output shaft 236 of the CVP 234. Accordingly, when the clutch device 266 is engaged, a power-transmission path may be provided from the CVP 234 to the shaft(s) 258, via the gears 138 and 272 and the clutch device 266.

In this way, for example, engaging the clutch device 262 and disengaging the clutches 264 and 266 may place the power train 12c in a mechanical-path mode, in which rotational power is directly transmitted from the engine 220, via the clutch device 262, to the shaft(s) 258. Further, engaging the clutch device 264 and disengaging the clutches 262 and 266 may place the power train 12c in a split-path mode, in which power from both the engine 220 and the CVP 234 is combined in the variator 240 before being transmitted, via the clutch device 264, to the shaft(s) 258. Finally, engaging the clutch device 266 and disengaging the clutches 262 and 264 may place the power train 12c in a CVP-only mode, in which rotational power is directly transmitted from the CVP 234, via the clutch device 266, to the shaft(s) 258.

Figure 5:
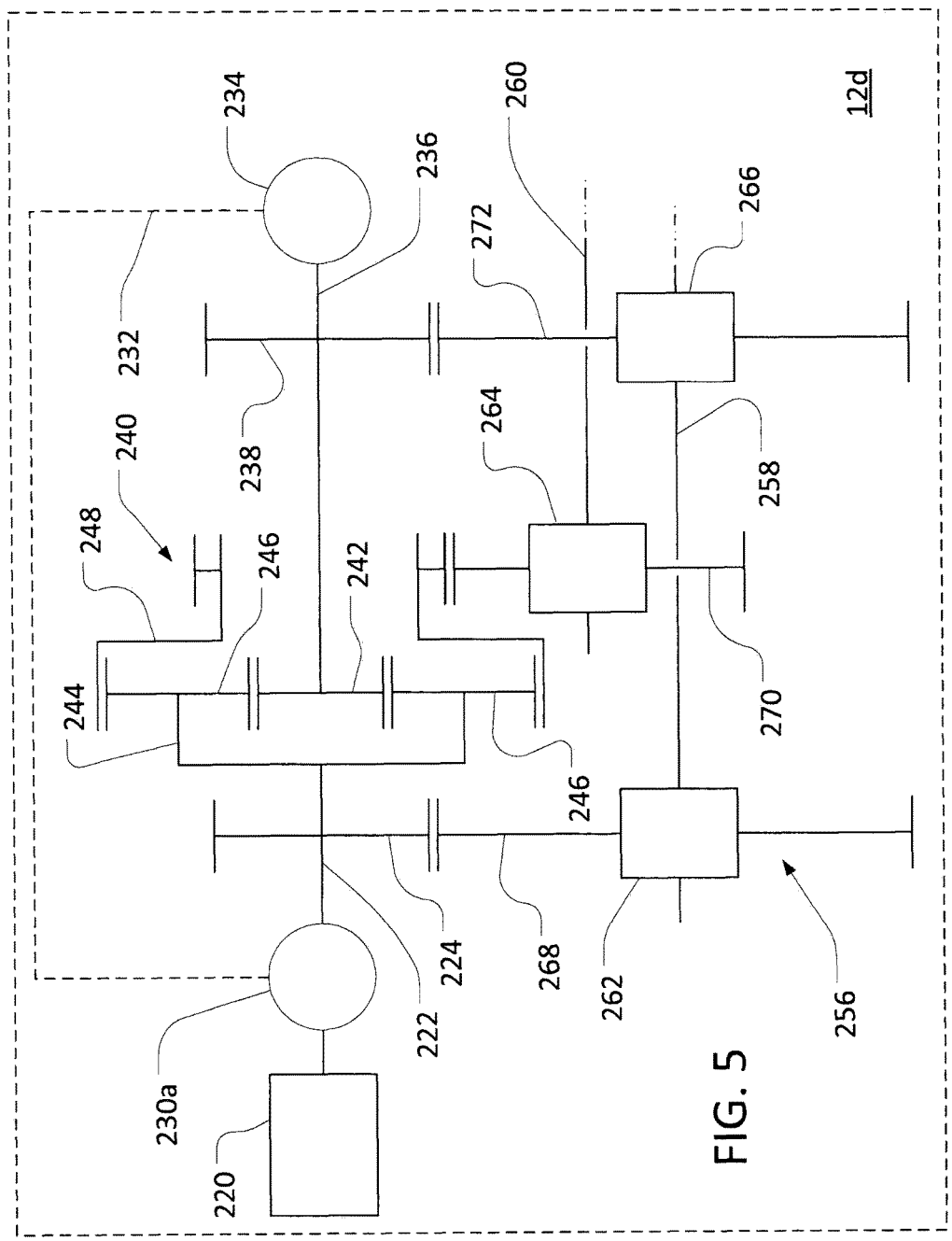
FIG. 5 is a schematic view of still another example power train of the example vehicle of FIG. 1.

Various other configurations may also be possible. For example, in certain embodiments (including embodiments similar to the examples presented above), a first CVP may be provided in series with an engine and a variator. Referring also to FIG. 5, for example, a power train 12d may be generally similar to the power train 12c of FIG. 4. In the power train 12d, however, a CVP 230a may be provided between the engine 220 and the variator 240, such that the engine 220 provides power to the CVP 230a and the variator 240 in series.

As noted above, in certain embodiments, multiple parallel (or other) shafts, including parallel and non-coaxial shafts, may be utilized for various functionality of the disclosed power train. As depicted in FIG. 4, for example, the various clutch devices 262, 264 and 266 of the control assembly 256 may be arranged on multiple parallel and non-coaxial shafts 258 and 260. Rotational power transmitted, respectively, to the shafts 258 and 260 may be utilized for distinct functionality, or may be recombined in various known ways (e.g., through another summing planetary gear set). Other configurations may also be possible, including configurations with a different number or arrangement of the various shafts.

In certain embodiments, various other configurations of the clutch devices 262, 264 and 266, with respect to the various associated shafts, may alternatively (or additionally) be utilized. For example, if the shaft 260 is in communication with a PTO shaft of the vehicle 10 and the CVP-only mode is expected to be utilized mainly for PTO operations, the clutch devices 262 and 264 may be mounted to the shaft 258 and the clutch device 266 may be mounted to the shaft 260. In certain embodiments, various of the clutch devices 62, 64, 162, 164 and 166 of FIGS. 2 and 3 (or various other clutch devices (not shown)) may also be mounted to various different parallel (or other) shafts.

The clutch devices of the control assemblies 56, 156, 256 (or other control assemblies) may be controlled by actuators of known configuration (not shown). These actuators, in turn, may be controlled by a transmission control unit ("TCU") (not shown), which may receive various inputs from various sensors or devices (not shown) via a CAN bus (not shown) of the vehicle 10. In certain embodiments, the various control assemblies may, for example, be controlled in accordance with programmed or hard-wired shift control logic contained in or executed by a TCU.

Similarly, the various CVPs contemplated by this disclosure (e.g., CVPs 30, 32, 130, 132, 230, 232, and 230a) may be controlled by various known means. For example, a TCU or other controller may control the output speed (or other characteristics) of a CVP based upon various inputs from various sensors or other controllers, various programmed or hard-wired control strategies, and so on. Transmission of converted power between CVPs (e.g., between the CVPs 30 and 32) and various intermediary devices, such as batteries or other energy storage devices (not shown) may also be similarly controlled.

In certain embodiments, additional gear sets (e.g., a set of range gears) may be interposed between the depicted components of the power trains 12 and various power sinks of the vehicle 10 (e.g., a differential or PTO shaft (not shown)). For example, a transmission of various configurations (e.g., multi-speed range transmission such as a wet-clutch range box with power shifting ability, or a power-shift range box with various synchronizers) may be provided downstream of the various clutch devices 62, 64, 162, 164, 166, 262, 264, 266 and so on, for further adjustment of speed and torque to power various vehicle power sinks.

In certain embodiments, the disclosed variators (e.g., the variators 40, 140, and 240) may generally provide infinitely variable control within a particular gear range (e.g., of a downstream power-shift transmission). Accordingly, the disclosed variators may be utilized to usefully address transient speed responses in a relevant vehicle or other platform (e.g., due to shifting between gears, changes in ground speed and so on), a traditional engine may be utilized to usefully address any transient torque requirements (e.g., due to changes in vehicle load), and the relevant control assembly may switch between transmission modes as appropriate.

In certain embodiments, the disclosed system may allow for relatively simple customization of various vehicle (or other) platforms. For example, a standard engine, a standard variator and standard control assembly components may be provided for a variety of vehicle platforms, with the needs of any particular platform being addressed through the inclusion of a particular transmission downstream of the control assembly (and through other customizations, as appropriate).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A power train for a vehicle including an engine, the power train comprising:
    a variator assembly configured to receive rotational power directly from the engine at a first input component of the variator assembly;
    a first continuously variable power source configured to receive rotational power from the engine and convert the received rotational power to a different form;
    a second continuously variable power source configured to receive the converted power from the first continuously variable power source, convert the received converted power to rotational power, and provide rotational power to a second input component of the variator assembly; and
    a control assembly with one or more output components and a plurality of clutch devices, each clutch device arranged between the one or more output components and at least one of the variator assembly and the engine, the control assembly configured to receive power from the variator assembly and the engine and to transmit the received power to the one or more output components via at least one of the plurality of clutch devices;
    wherein, in a first state of the control assembly, the plurality of clutch devices collectively provides direct transmission of power from only the engine to the one or more output components without transmission of power from the second continuously variable power source;
    wherein, in a second state of the control assembly, the plurality of clutch devices collectively transmits to the one or more output components power that is received, via the variator assembly, from both the engine and the second continuously variable power source;
    wherein, in a third state of the control assembly, the plurality of clutch devices collectively provides direct transmission of power from only the second continuously variable power source to the one or more output components without direct transmission of power from the engine;
    wherein the plurality of clutch devices includes a first clutch device receiving power directly from the engine, a second clutch device receiving power, via the variator assembly, from both the engine and the second continuously variable power source, and a third clutch device receiving power directly from the second continuously variable power source;

wherein, in the first state of the control assembly, the first clutch device is engaged to transmit power from the engine to the one or more output components, and the second clutch device is disengaged to disconnect the variator assembly from the one or more output components;

wherein, in the second state of the control assembly, the first clutch device is disengaged, and the second clutch device is engaged to transmit power from the variator assembly to the one or more output components; and wherein, in the third state of the control assembly, the first and second clutch devices are disengaged, and the third clutch device is engaged to transmit power directly from the second continuously variable power source to the one or more output components.

2. The power train of claim 1, wherein the one or more output components is one or more shafts, and the first and second clutch devices are mounted to the one or more shafts in the control assembly that rotate in parallel with at least one of an output shaft of the engine and an output shaft of the second continuously variable power source.

3. The power train of claim 2, wherein the first and second clutch devices are arranged on one of a single shaft of the one or more shafts and a set of coaxial shafts of the one or more shafts.

4. The power train of claim 1, wherein at least one of the first, second, and third clutches is mounted to a first shaft and at least an other of the first, second, and third clutches is mounted to a second shaft rotating in parallel with the first shaft.

5. The power train of claim 1, wherein the variator assembly includes a planetary gear set with a planet carrier, a sun gear, and a ring gear; and wherein the first input component includes one of the planet carrier, the sun gear and the ring gear, and the second input component includes an other of the planet carrier, the sun gear and the ring gear of the planetary gear set.

6. The power train of claim 1, wherein the first continuously variable power source receives rotational power from the engine in series with the first input component of the variator assembly, the first continuously variable power source being between the engine and the variator assembly.

7. A vehicle with an engine, the vehicle comprising:
a variator assembly configured to receive rotational power directly from the engine at a first input component of the variator assembly;
a first continuously variable power source configured to receive rotational power from the engine and convert the received rotational power to a different form;
a second continuously variable power source configured to receive the converted power from the first continuously variable power source, convert the received converted power to rotational power, and provide rotational power to a second input component of the variator assembly; and
a control assembly with one or more output components and a plurality of clutch devices, each clutch device arranged between the one or more output component and at least one of the variator assembly and the engine, the control assembly configured to receive power from the variator assembly and the engine and to transmit the received power to the one or more output components via at least one of the plurality of clutch devices;
wherein, in a first state of the control assembly, the plurality of clutch devices collectively provides direct transmission of power from only the engine to the one or more output components without transmission of power from the second continuously variable power source;

wherein, in a second state of the control assembly, the plurality of clutch devices collectively transmits to the one or more output components power that is received, via the variator assembly, from both the engine and the second continuously variable power source;

wherein, in a third state of the control assembly, the plurality of clutch devices collectively provides direct transmission of power from only the second continuously variable power source to the one or more output components without direct transmission of power from the engine;

wherein the plurality of clutch devices includes a first clutch device receiving power directly from the engine, a second clutch device receiving power, via the variator assembly, from both the engine and the second continuously variable power source, and a third clutch device receiving power directly from the second continuously variable power source;

wherein, in the first state of the control assembly, the first clutch device is engaged to transmit power from the engine to the one or more output components, and the second clutch device is disengaged to disconnect the variator assembly from the one or more output components;

wherein, in the second state of the control assembly, the first clutch device is disengaged, and the second clutch device is engaged to transmit power from the variator assembly to the one or more output components; and wherein, in the third state of the control assembly, the first and second clutch devices are disengaged, and the third clutch device is engaged to transmit power directly from the second continuously variable power source to the one or more output components.

8. The vehicle of claim 7, wherein the first and second output components is one or more shafts, and the first and second clutch devices are mounted to the one or more shafts in the control assembly that rotate in parallel with at least one of an output shaft of the engine and an output shaft of the second continuously variable power source.

9. The vehicle of claim 8, wherein the first and second clutch devices are arranged on one of a single shaft of the one or more shafts and a set of coaxial shafts of the one or more shafts.

10. The vehicle of claim 7, wherein at least one of the first, second, and third clutches is mounted to a first shaft and at least an other of the first, second, and third clutches is mounted to a second shaft rotating in parallel with the first shaft.

11. The vehicle of claim 7, wherein the variator assembly includes a planetary gear set with a planet carrier, a sun gear, and a ring gear; and wherein the first input component includes one of the planet carrier, the sun gear and the ring gear, and the second input component includes an other of the planet carrier, the sun gear and the ring gear of the planetary gear set.

12. The vehicle of claim 7, wherein the first continuously variable power source receives rotational power from the engine in series with the first input component of the variator assembly, the first continuously variable power source being between the engine and the variator assembly.

13. A power train for a vehicle including an engine, the power train comprising:

a variator assembly configured to receive rotational power directly from the engine at a first input component of the variator assembly;

a first continuously variable power source configured to receive rotational power from the engine and convert the received rotational power to a different form;

a second continuously variable power source configured to receive the converted power from the first continuously variable power source, convert the received converted power to rotational power, and provide rotational power to a second input component of the variator assembly; and a control assembly having one or more output components as one or more transmission shafts rotating in parallel with at least one of an output shaft of the engine and an output shaft of the second continuously variable power source, a first clutch device in direct communication with the one or more output components via the one or more transmission shafts, a second clutch device in direct communication with the one or more output components via the one or more transmission shafts, and a third clutch device in direct communication with the one or more output components via the one or more transmission shafts, the first clutch device receiving power directly from the engine for transmission to the one or more output components, the second clutch device receiving power from the variator assembly for transmission to the one or more output components, and the third clutch device receiving power directly from the second continuously variable power source;

wherein, in a first state of the control assembly, the first clutch device is engaged to transmit power from only the engine to the one or more output components, and the second clutch device is disengaged to disconnect the variator assembly from the one or more output components to prevent transmission of power from the second continuously variable power source;

wherein, in a second state of the control assembly, the first clutch device is disengaged, and the second clutch device is engaged to transmit power from both the engine and the second continuously variable power source to the one or more output components; and wherein, in a third state of the control assembly, the first and second clutch devices are disengaged, and the third clutch device is engaged to transmit power directly from only the second continuously variable power source to the one or more output components without direct transmission of power from the engine.

14. The power train of claim 13, wherein the first and second clutch devices are arranged on at least one of a single shaft of the one or more transmission shafts and a set of coaxial shafts of the one or more transmission shafts.

15. The power train of claim 13, wherein the first, second and third clutch devices are arranged on at least one of a single shaft of the one or more transmission shafts and a set of coaxial shafts of the one or more transmission shafts.

* * * * *